(12) United States Patent
Klein Gunnewiek et al.

(10) Patent No.: US 8,447,096 B2
(45) Date of Patent: May 21, 2013

(54) METHOD AND DEVICE FOR PROCESSING A DEPTH-MAP

(75) Inventors: Reinier Bernardus Maria Klein Gunnewiek, Eindhoven (NL); Wilhelmus Hendrikus Alfonsus Bruls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 471 days.

(21) Appl. No.: 12/681,637

(22) PCT Filed: Oct. 2, 2008

(86) PCT No.: PCT/IB2008/054027
§ 371 (c)(1),
(2), (4) Date: Apr. 5, 2010

(87) PCT Pub. No.: WO2009/047681
PCT Pub. Date: Apr. 16, 2009

(65) Prior Publication Data
US 2010/0215251 A1 Aug. 26, 2010

(30) Foreign Application Priority Data
Oct. 11, 2007 (EP) ...................... 07118272

(51) Int. Cl.
*G06K 9/36* (2006.01)
*H04N 5/225* (2006.01)
*G06T 15/00* (2011.01)

(52) U.S. Cl.
USPC ...... 382/154; 382/235; 348/169; 348/E13.06; 345/419

(58) Field of Classification Search
USPC ............ 345/848, 418, 419; 396/324; 342/90; 709/217; 348/43, 48, 169, 208, 14, 154, E13.06, 348/E13.002, E13.001, E13.004, E13.026, 348/E13.022, E13.003, 554, 385.12; 382/154, 382/103, 107, 118, 173, 104, 106, 242, 203, 382/235; 375/240.12, 240.09, 240.01
See application file for complete search history.

(56) References Cited

U.S. PATENT DOCUMENTS
6,252,974 B1    6/2001  Martens et al.
6,377,257 B1 *  4/2002  Borrel et al. .................. 345/419
(Continued)

FOREIGN PATENT DOCUMENTS
EP  1355274 A2    10/2003
WO  2006137000 A1 12/2006
(Continued)

OTHER PUBLICATIONS
Shade et al: "Layered Depth Images"; SIGGRAPH 1998, Computer Graphics Proceedings, Annual Conference Series, 1998, pp. 231-242.
Chen et al: "Efficient Depth Image Based Rendering With Edge Dependent Depth Filter and Interpolation"; Multimedia and Expo, 2005, IEEE International Conference in Amsterdam, NL, Jul. 2005, pp. 1314-1317.
(Continued)

*Primary Examiner* — Sheela Chawan (57) ABSTRACT

A device and apparatus for processing a depth-map including obtaining a depth-map based on a lossy compressed depth-map, the depth-map including depth information of a scene from a viewpoint, the scene includes an object; obtaining occlusion information for the scene from the viewpoint, the occlusion information including information occluded by the object in the depth-map; and processing at least part of the depth information using at least part of the occlusion information in order to reduce compression artifacts in the depth-map.

16 Claims, 8 Drawing Sheets

U.S. PATENT DOCUMENTS

| | | | |
|---|---|---|---|
| 6,674,877 B1 * | 1/2004 | Jojic et al. | 382/103 |
| 6,791,540 B1 * | 9/2004 | Baumberg | 345/419 |
| 6,909,747 B2 * | 6/2005 | Bordes et al. | 375/240.12 |
| 7,103,211 B1 * | 9/2006 | Medioni et al. | 382/154 |
| 7,139,423 B1 * | 11/2006 | Nicolas et al. | 382/154 |
| 7,576,737 B2 * | 8/2009 | Fujiwara et al. | 345/419 |
| 2002/0186216 A1 * | 12/2002 | Baumberg et al. | 345/422 |
| 2006/0056679 A1 * | 3/2006 | Redert et al. | 382/154 |
| 2008/0044078 A1 * | 2/2008 | Mantzel | 382/154 |
| 2008/0150945 A1 * | 6/2008 | Wang et al. | 345/427 |

FOREIGN PATENT DOCUMENTS

| | | | |
|---|---|---|---|
| WO | 2007132397 A2 | 11/2007 | |
| WO | 2008041178 A2 | 4/2008 | |

OTHER PUBLICATIONS

Bleyer et al: "A Layered Stereo Matching Algorithm Using Image Segmentation and Global Visibility Constraints"; Interactive Media Systems Group, Institute for Software Technology and Interactive Systems, Vienna University of Technology, Apr. 2005, 34 Page Document.

Varekamp: "Compression Artifacts in 3D Television Signals"; IEEE Benelux/DSP Valley Signal Processing Sysmposium, 2006.

R-P. Berretty et al, "High quality images from 2.5D video", Eurographics 2003/ M. Chover, H. Hagen and D. Tost, Philips Research, Prof. Holstlaan 4, Eindhoven, The Netherlands.

* cited by examiner

METHOD AND DEVICE FOR PROCESSING A DEPTH-MAP

FIELD OF THE INVENTION

The present invention relates to a method and device for processing a depth-map.

BACKGROUND OF THE INVENTION

For some time various companies have been actively developing auto-stereoscopic displays suitable for rendering three-dimensional (3D) imagery. Autostereoscopic devices can present viewers with a 3D impression without the need for special headgear and/or glasses.

Autostereoscopic displays generally provide different views for different viewing angles. In this manner a first image can be generated for the left eye and a second image for the right eye of a viewer. By displaying appropriate images, i.e. appropriate from the viewpoint of the left and right eye respectively, it is possible to convey a 3D impression to the viewer.

A variety of techniques are used to generate images for autostereoscopic displays. For example, multi-view images can be recorded using multiple cameras, wherein the position of the respective camera corresponds with the respective viewpoint of each respective view.

In order to maintain backwards compatibility and improve on bandwidth usage many of the current autostereoscopic displays use an input signal comprising a sequence of conventional two-dimensional (2D) images and corresponding depth-maps.

Depth-maps provide depth information indicative of the absolute or relative distance of objects depicted in the image to the camera. By way of example, 8-bit grey-scale images are commonly used to represent depth information. Depth-maps can provide depth information on a per-pixel basis, but as will be clear to the skilled person may also use a coarser granularity, such as a lower resolution depth-map wherein each depth-map value provides depth information for multiple pixels.

Disparity maps can be used as an alternative to the above mentioned depth-maps. Disparity refers to the apparent shift of objects in a scene when observed from two different viewpoints, such as from the left-eye and the right-eye viewpoint. Disparity information and depth information are related and can be mapped onto one another provided the geometry of the respective viewpoints of the disparity map are known, as is commonly known to those skilled in the art.

In view of this close relationship and the fact that one can be transformed into the other, the term "depth-map" and "depth information" used throughout the description are understood to comprise depth information as well as disparity information.

By providing an autostereoscopic display with an image sequence and a corresponding sequence of depth information maps, or depth-maps for short, the autostereoscopic display can render multiple views of the content for one or more viewers. In the above manner a conventional signal is enhanced with a depth-map.

In order to improve the quality of multi-view rendering using a 2D+depth signal, additional occlusion information also referred to as de-occlusion information, may be provided. (De-)occlusion information relates to image and/or depth information which can be used to render views for viewpoints other than those of the 2D+depth information provided. When rendering a view based on the 2D+depth information for a viewpoint that differs from that of the 2D+depth information, information may be required that is not present in the original 2D+depth information. This information may be provided in the occlusion information; in addition to the information that was occluded by objects, the occlusion information may also comprise information in the vicinity of occluded regions. The availability of occlusion information enables filling in of holes which occur when rendering views using a 2D+depth signal. Throughout the application the term occlusion information is understood to comprise occluded image information and/or occluded depth information that can be used for filling in de-occluded regions in the view-rendering process.

International Application WO2006/137000 discloses a method of combined exchange of image data and further data, such as occlusion data. Although the above format is particularly well suited for the exchange of 3D content between e.g. a set-top box (STB) and a display, there is a need to further reduce the size of such 3D content when transmitting or distributing such content over a bandwidth-limited medium. Although lossy compression algorithms, such as lossy DCT-based compression algorithms, may provide a significant reduction in size, they also tend to introduce noise. "Compression artifacts in 3D television signals" by Chris Varekamp, presented at the second annual IEEE BENELUX/DSP Valley Signal Processing Symposium (SPS-DARTS 2006) shows that the effect of noise in a depth-map can, as a result of the multi-view rendering process, result in serious parallax errors, in particular on object boundaries. This effect is a direct result of the fact that the compression algorithm is tuned to reduce the perceived error in the depth-map rather than in the resulting rendered multi-view images.

SUMMARY OF THE INVENTION

It is an object of the present invention to provide a method of processing a depth-map that aims to reduce the effect of noise in a depth-map that originates from a lossy compression scheme.

This object is achieved in that the method according to the present invention comprises obtaining a depth-map based on a lossy compressed depth-map, the depth-map comprising depth information of a scene from a viewpoint, the scene comprising an object, obtaining occlusion information for the scene from the viewpoint, the occlusion information comprising information occluded by the object in the depth-map, and processing at least part of the depth information using at least part of the occlusion information in order to reduce compression artifacts in the depth-map.

The present invention thus uses the occlusion information that was originally intended to provide information for de-occluded areas, for processing part of the depth information. Noise, such as mosquito noise and speckles that are present in the depth-map can thus be reduced using data from the depth-map as well as the occlusion information.

In case the occlusion information relates to occluded image information, the occluded image information can be used to provide information with regard to the boundary of the occluded region. Consequently, the depth-map can be filtered, using an edge-preserving function, such as e.g. a K-means like algorithm, in order to reduce noise in the depth-map in the vicinity of the occlusion boundary.

Alternatively, the occluded image information may be used together with well-known heuristics known to those skilled in the art for regenerating the depth-map in the occluded region. The output in the form of a depth-map for the occluded region can be used to provide additional information for filtering the depth map; in this manner depth values that as a result of compression artifacts appear to be positioned behind the depth-map for the occluded region can be corrected using the values from the depth map for the occluded region.

More alternatively, when the occlusion information relates to occluded depth information, the occluded depth information can be used for filtering the depth-map directly, i.e. without the need for establishing boundaries, or regenerating occluded depth map information.

In an embodiment, the processing step comprises processing of at least part of the depth information within a region around a transition in the depth information related to the object. Lossy compression schemes generally have some difficulty in representing strong depth transitions accurately. Often some sort of quantization, ringing, and/or ghosting may be introduced in the proximity of such transitions. Unfortunately, noise in such depth transitions typically results in highly visible artifacts in views that are rendered using this depth information. Therefore, this particular embodiment represents an advantageous compromise between the required amount of processing and the perceived improvement.

In a further embodiment, which is particularly efficient, provided that information is available with regard to the object outlines, processing of the depth information is performed within a region around the object.

In an embodiment, metadata is provided that provides information pertaining to the size of the region for processing. Consequently, a minimum amount of processing can be specified beforehand, thereby providing content creators control over the final output.

The present invention may be used with particular advantage in embodiments wherein the lossy compression algorithm used for generating the lossy compressed depth-map introduces noise around transitions in depth information. Furthermore, the present invention may be used with particular advantage in embodiments wherein the lossy compression algorithm used for generating the lossy compressed depth-map uses a frequency domain representation for representing depth information in the lossy compressed depth-map.

In an embodiment, the present invention further comprises establishing a first transition in the depth information. Preferably, the embodiment also establishes second transitions using the occluded depth information. The first transitions may be used to limit the amount of processing to regions wherein edges need to be substantially preserved. By combining the information provided by the first transitions and the second transitions it is possible to determine where the depth information comprises a transition and the occluded depth information is continuous. Lossy compression artifacts are often found near transitions in depth information. Hence, if the occluded depth information also comprises depth information that is visible in the center view, and there is no such transition in the occluded depth information, then this depth information is statistically more reliable than the depth information from the depth information that comprises the transition.

In an embodiment according to the present invention, the depth information and occlusion information are provided in a coded image sequence, such as a coded data stream that is transmitted over a transmission channel, or a coded data stream that is distributed on a storage medium. Preferably, metadata, such as e.g. a dilation factor, providing information pertaining to the size of the region to be processed is provided in one and the same coded data stream. Alternatively, dilation information may be coded so as to enable the application of non-uniform dilation regions, e.g. by encoding object dilation boundaries explicitly.

In an embodiment, the processing step comprises establishing a replacement criterion for a pixel from the depth information in the proximity of a depth transition wherein the replacement criterion classifies the side of the transition that the pixel belongs to. Subsequently, the pixel from the depth information is conditionally replaced by a replacement pixel based on the replacement criterion, wherein the replacement pixel statistically corresponds with the spatial context as indicated by the replacement criterion. In this embodiment, at least one of the replacement criterion and the replacement pixel are based on occlusion information. Hence, the additional occlusion information is used to compensate for noise as a result of compression of the depth information.

The object of the present invention is further achieved by means of a device according to the present invention that comprises means arranged to obtain a depth-map based on a lossy compressed depth-map, the depth-map comprising depth information of a scene from a viewpoint, the scene comprising an object, means arranged to obtain occlusion information for the scene from the viewpoint, the occlusion information comprising information occluded by the object in the depth-map, and means arranged to process at least part of the depth information using at least part of the occlusion information in order to reduce compression artifacts in the depth-map.

BRIEF DESCRIPTION OF THE DRAWINGS

These and other advantageous aspects of the invention will be described in more detail using the following Figures.

The Figures are not drawn to scale. Generally, identical components are denoted by the same reference numerals in the Figures.

DETAILED DESCRIPTION OF EMBODIMENTS

In order to provide 3D content at the time of introduction of autostereoscopic displays and/or other stereoscopic display devices, conventional 2D content could initially be converted from 2D to 3D at the end-user. However, as depth-maps generated at the display side will typically have imperfections, resulting from a lack of depth information in 2D content signals, there will be a need for better depth-maps.

Depth-maps that are generated at the acquisition and/or transmission side can have a much higher quality due to the fact that resource requirements at the acquisition side are generally no issue. Moreover, as there is no need to generate data in real-time, the throughput time is no issue either. In addition, in a professional environment there will generally be more information available, such as footage in the form of stereo input, or even multiview input. Finally, at the acquisition side, in particular for content creation in a studio environment, there also is an opportunity for interactive content creation.

When depth-maps are generated at the acquisition side, the additional bandwidth required for the representation of these depth maps is an important factor. Moreover, there will be a need for a standard for transmitting such depth-maps.

High-quality depth-maps enable 3D displays to convey a better impression of depth. However, as a result of this improved depth reproduction, artifacts, such as those resulting from de-occlusion of information that in a center view of an image is occluded by foreground objects, will become (more) visible.

Occlusion data can be generated at the display and at the acquisition side. Again, at the acquisition side, the quality of the generated occlusion data can be significantly higher. Therefore, occlusion data generated at the acquisition side will be preferred. The occlusion data that is generated at the acquisition side will be used at the display side to render views for presentation on a 3D display. Although, as a first order approximation it is possible to use the depth/disparity data from the visible background for impainting occlusion areas, this first order approximation does have its limitations.

Annotating occlusion data in the form of image information and/or depth information enables a higher-quality rendering. However, from a coding point of view additional data will further increase the bit rate, or affect quality. The thus generated data comprising an image, a depth-map, occluded image information and occluded depth information can subsequently be coded prior to transmission or distribution. In order to reduce the cost of such implementations it is preferable to use existing algorithms for coding such information, such as e.g. a conventional H.264 encoder.

However, during experiments with conventional encoders it was observed that the quality of the depth-map after compression and subsequent decompression has to be high in order not to introduce visible artifacts. One way of addressing this issue is by lowering the compression requirements for the occlusion information. From a coding point of view, this is not preferred.

The present invention however proposes an alternative in the form of a post-processing step that aims to reduce the noise present in the depth-map comprising depth information corresponding to the image data, and optionally also in occlusion information.

Occlusion/De-Occlusion

Figure 1:
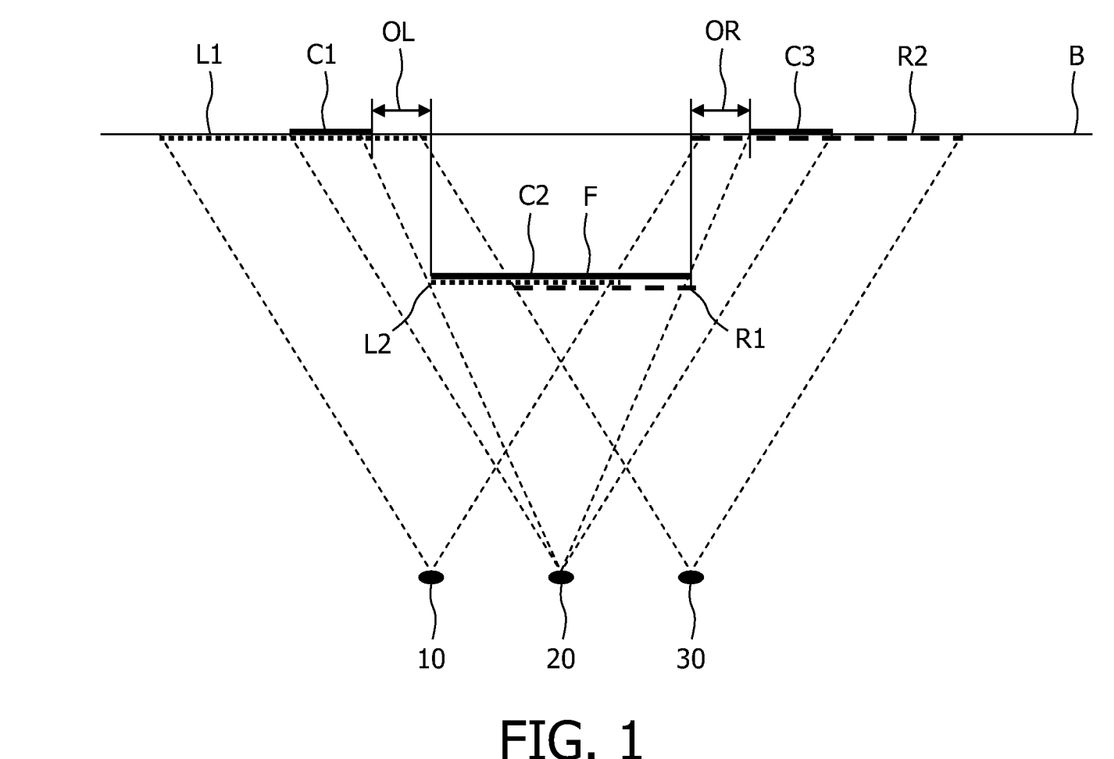
FIG. 1 shows de-occlusion data for a center view.

FIG. 1 illustrates the concept of occlusion. FIG. 1 represents a top view of a scene comprising a background, represented as the top horizontal line B, and an object represented by line F positioned between the horizontal line B and the center viewpoint 20. The image will be coded as perceived from a center viewpoint 20. This implies that image data, occluded image data, depth data and occluded depth data will be coded for the center viewpoint 20.

At the rendering engine, or alternatively at the display, the center view data will be used to render at least two images. The center view image will comprise the information C1, C2 and C3, respectively. However, from the left eye viewpoint the information L1 and L2 will be visible; likewise, from the right eye viewpoint the information R1 and R2 will be visible. From the left eye viewpoint 10, information becomes visible that in the center viewpoint 20 image was occluded by the object F, the occluded information being indicated using the arrow OL. Likewise, from the right eye viewpoint 30 information becomes visible that in the center viewpoint 20 image was occluded by the object F, this information being indicated using the arrow OR.

In the above case, image occlusion information may be added for the regions indicated by the arrows OL and OR.

Figure 2:
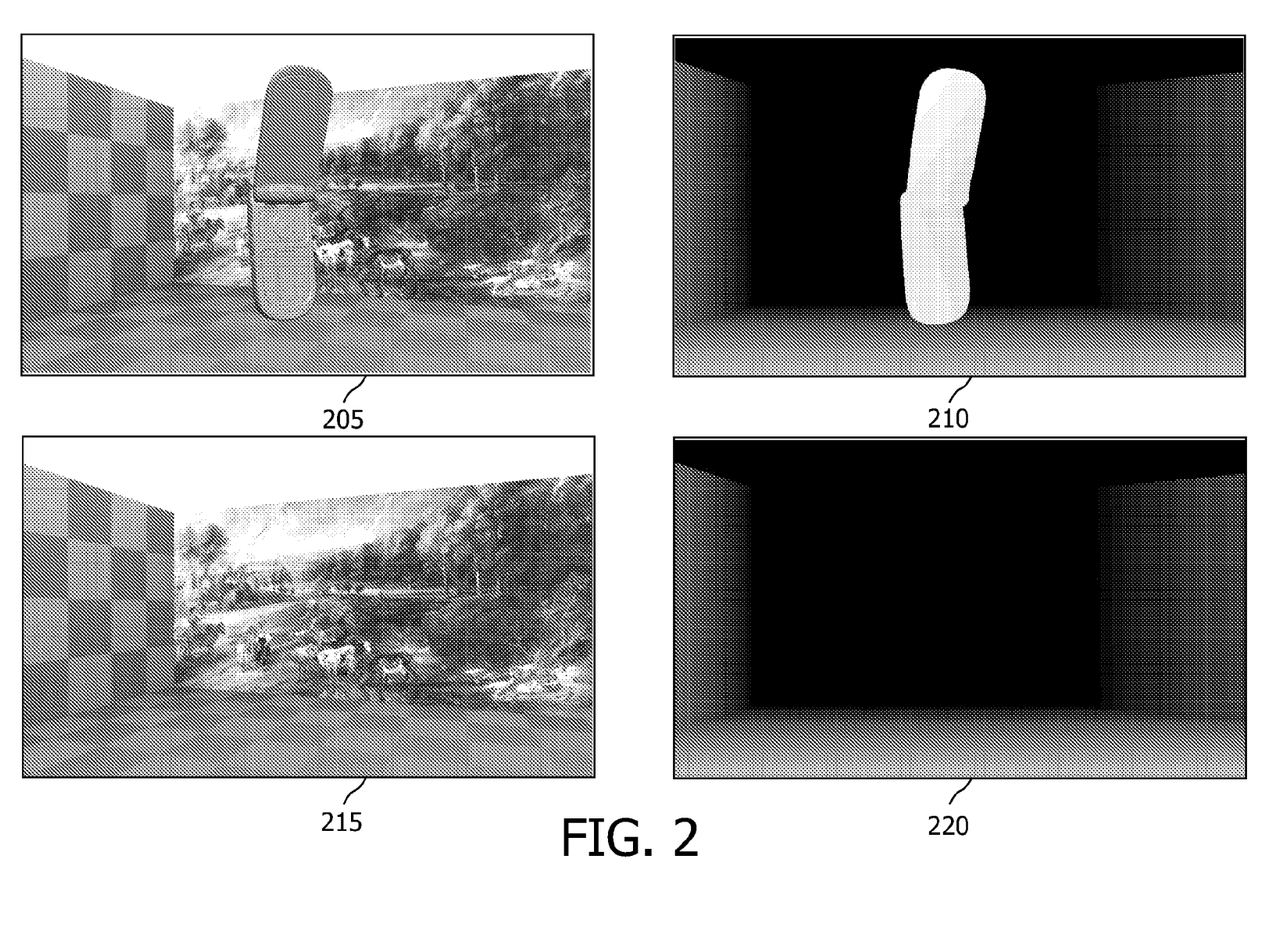
FIG. 2 shows a four quadrant representation of an input signal comprising image data, depth data, image occlusion data, and depth occlusion data.
Figure 3:
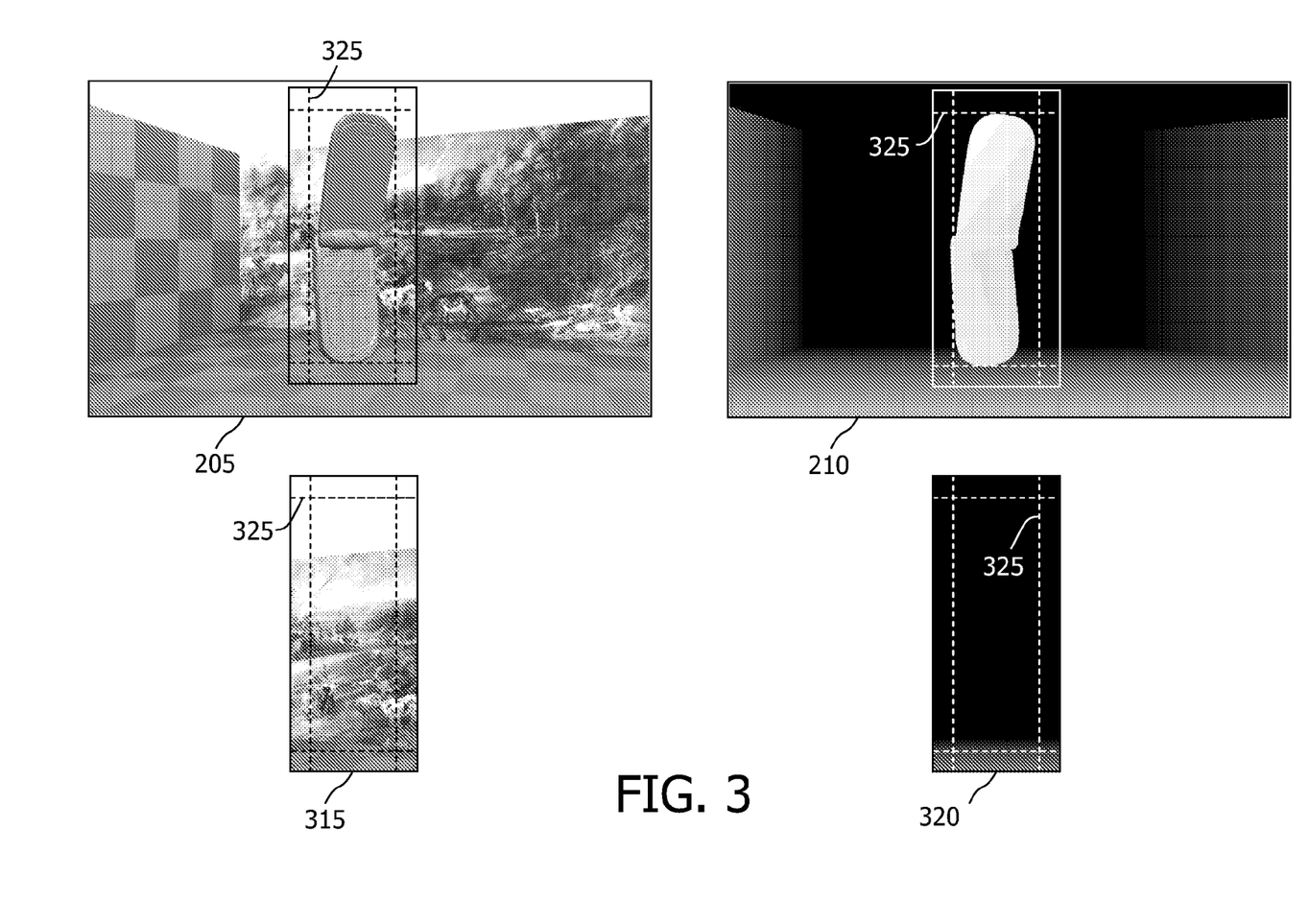
FIG. 3 shows a four quadrant representation using more efficiently coded occlusion information.
Figure 4:
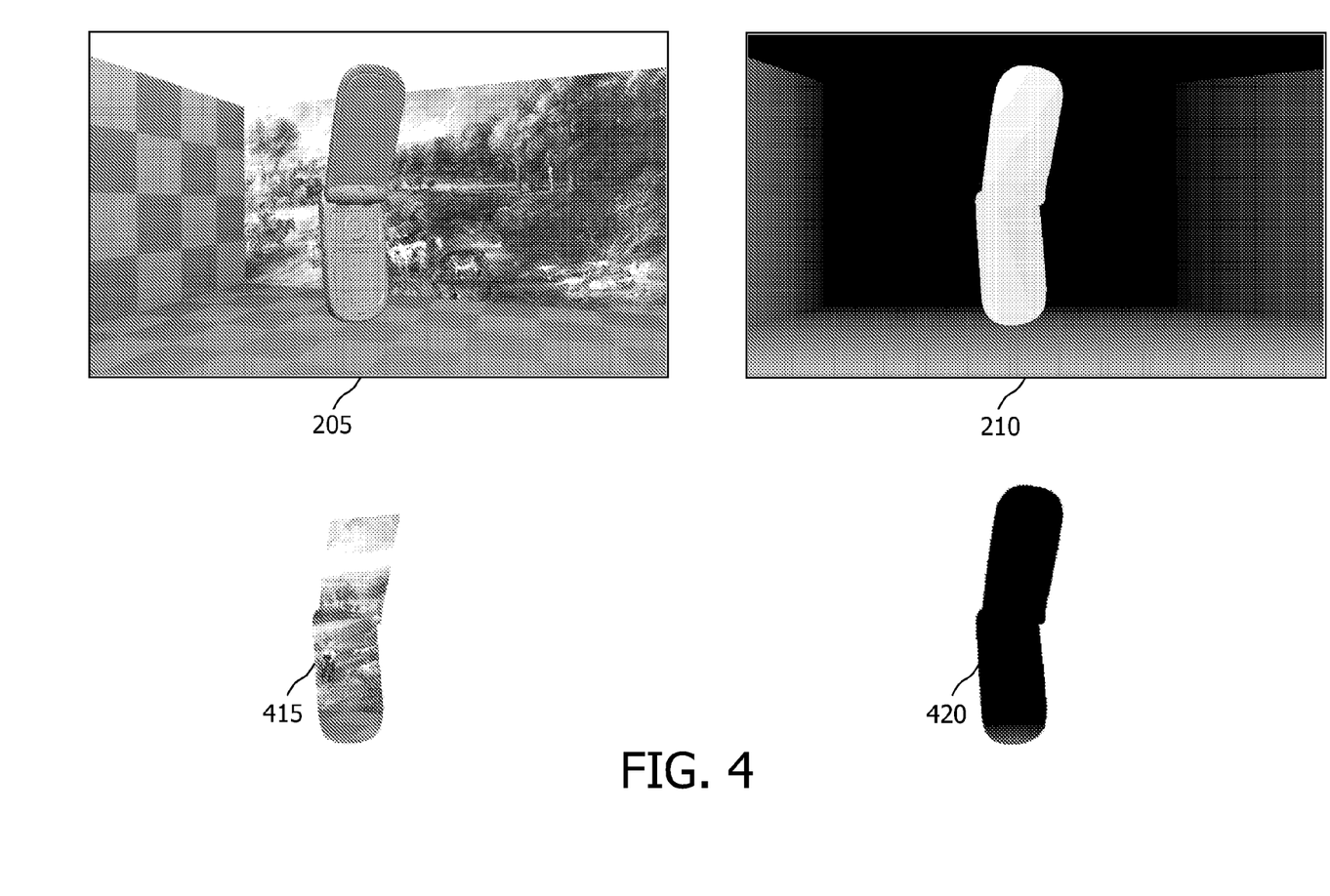
FIG. 4 shows a further four quadrant representation.
Figure 5:
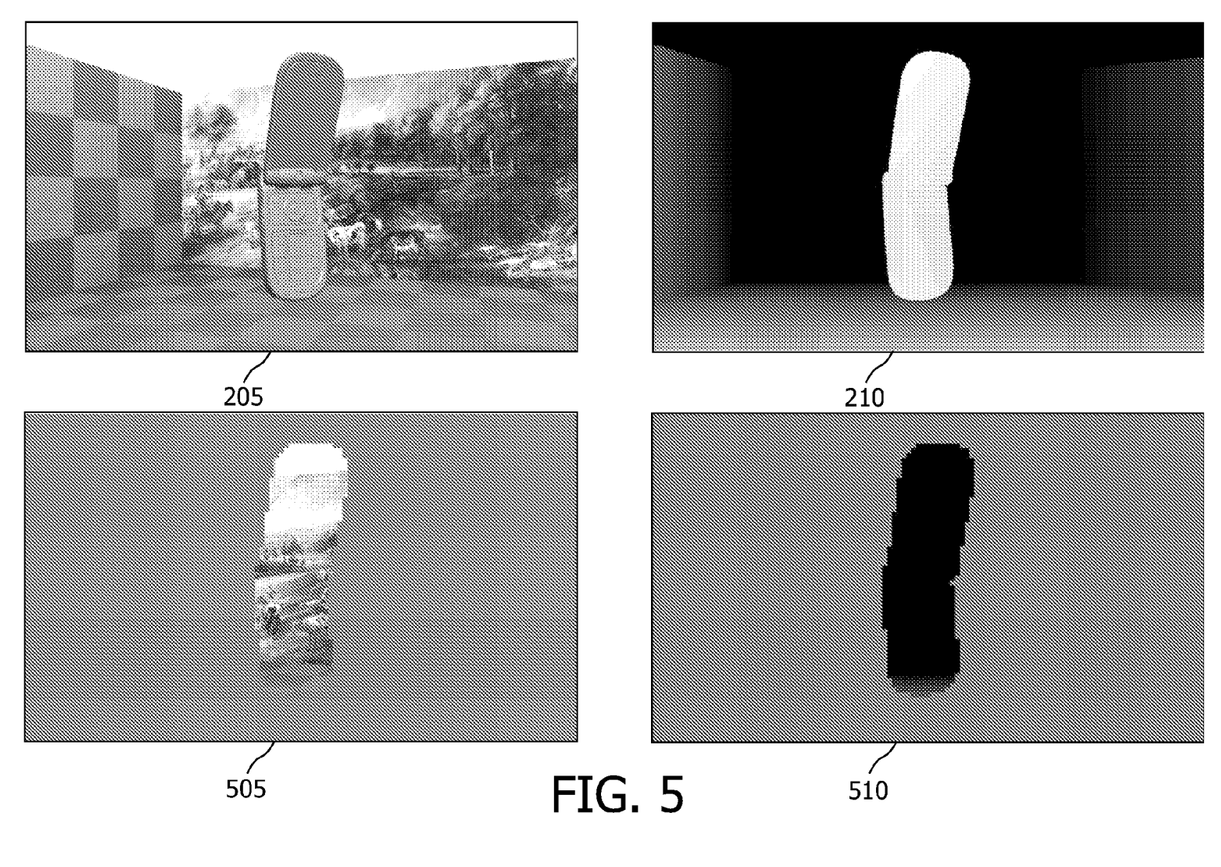
FIG. 5 shows a preferred four quadrant representation.

FIG. 2 shows a representation of a center view image 205, occlusion data 215, and the corresponding depth maps 210 and 220, respectively, on the right hand side. The depth values in this example are coded such that the brighter the depth value, the closer that object is to the viewer. The scene in question depicts a mobile phone floating in mid-air in a room. Although in the present example occlusion data is provided for the entire scene, this is not required by the present invention, as is illustrated in FIGS. 3, 4 and 5. It should be noted that in the examples shown here the occlusion data is generated for the center view. As a result, the occlusion data/second layer is the data that becomes visible when objects in the center view are removed from the center view. The invention may however also be applied to embodiments wherein the image and depth information is coded for an off-center viewpoint, such as for example either the left or the right eye viewpoint.

FIG. 3 shows another representation wherein occlusion data is provided for the region behind the mobile phone as indicated by framework 325. In this example, occluded image information and occluded depth information are provided for a square extending over the object boundary. An advantage of this particular representation (as well as that presented in FIG. 2) is that the occluded image information and the occluded depth information provide information for the region behind the object as well as information in the vicinity of the depth transition between object and background. As a result, artifacts in both regions can be filtered using the occluded image and/or depth information.

FIG. 4 shows another representation wherein the occlusion data is provided only for the regions occluded by the mobile phone. An advantage of this particular representation is its compact size; a disadvantage is however that it does not provide much information with regard to the object boundary. It does however allow removal of coding artifacts in the depth map within the object; after all, the depth information in the depth-map 210 has to be in front of the depth information 510 provided in the occluded depth information 420.

FIG. 5 presents a further preferable representation. This representation once more comprises the image 205 and the depth-map 210. In addition there is provided a lower-resolution occluded image 505 and corresponding occluded depth information 510. Note that the predominant grey tone in the occluded image 505 and occluded depth information represents muted areas which are coded as such for reasons of coding efficiency.

Before a multi-view image can be synthesized, the low-resolution image should be up-scaled. Up-scaling can be done in a naive manner, or intelligently using e.g. a color-adaptive bilateral up-scaling filter such as described in the co-pending International Patent Application IB2007/051701 (Attorney Docket PH005826). Next, the muted areas are replaced by the respective pixel values of the image 205 and the depth-map 210. The resulting occlusion information then resembles that presented in FIG. 2.

The FIGS. 2, 3, 4 and 5 represent a first order approximation of the layered depth images (LDI)-format. For a detailed description of the layered depth format the reader is referred to "Layered depth images", by J. Shade, S. Gortler, L. He, R. Szeliski, published in SIGGRAPH Proceedings of the 25th conference, 1998.

From a coding-efficiency point of view, it may further be considered to omit the depth-map for the occlusion layer. In this case, the occluded image information can be used to control filtering of the depth information 210. In the later case, two approaches exist to improve the depth-map quality:

Use the occluded image information to process the depth information.

Use the occluded image information to regenerate the occluded depth information and use the occluded depth information to filter the depth information.

According to the first approach, the image information 205 and occluded image information 415 may be used to establish the object boundary. Subsequently, the depth-map 210 is preferably filtered in a region around this boundary using an edge-preserving filter. The rationale behind this approach is that typically strong transitions in the depth-map 210, such as on object boundaries, are prone to compression artifacts. Such artifacts may however be reduced by means of an edge-preserving filter, such as a K-means filter.

Information provided by the image information 205, the depth information 210 and the occluded image information 415 may be used to establish the region wherein such a filter is applied. Subsequently, the depth information 210 can be filtered within a particular distance to depth transitions, or alternatively within a particular distance to object boundaries. In the case of e.g. a DCT-based compression scheme, this distance might be defined as being the diagonal of a macroblock.

According to the second approach, the image information 205, the depth information 210 and the occluded image information 415 may be used to regenerate occluded depth information 420 using heuristics known to those skilled in the art. Reference is made to co-pending International Patent Application IB2007/051701 (Attorney Docket PH005826) and European patent application 06301011.0 (Attorney Docket PH006957) that describes particularly favorable methods of reconstructing occluded depth information 420 using a color-adaptive bilateral filter.

By combining image information 205 and occluded image information 415, a reference image can be constructed for use with the color-adaptive bilateral filter. By associating weights to the depth information from depth-map 210, the influence on the reconstruction process of the occluded depth information can be reduced. Once the occluded depth information is reconstructed it may be used to filter the depth information related to the object.

A further low-cost alternative to generate occluded image information and/or occluded depth information is to apply stretching of information from the 2D+depth information, i.e. to stretch information adjacent to the occluded region into the occlusion region.

Rendering of a 3D Sequence Using Occlusion Data

The occlusion information described above can be used to synthesize a further view. On an (auto)stereoscopic display, 3D is perceived as a result of the fact that the observer with his left eye perceives a slightly different image than with his right eye.

These views are generated using, in the examples described herein, information from a center view and its associated depth/disparity map. This disparity/depth map implies how the pixels of the center view should be rendered for the various views. When an image is rendered/synthesized for a particular view, some pixels may be undefined and hence a hole will occur.

A first order approach to resolve this is to use pixel values of pixels that previously have been encountered on a horizontal line. If the scanning order is chosen properly, then the last encountered pixel will be the pixel that reflects background information. This process is referred to as stretching and, from an implementation point of view, is the easiest to implement. At positions where there is a strong transition in the depth-map, i.e. where an object is both clearly and far in front of another object, one can typically observe artifacts due to the aforementioned stretching.

The abovementioned occlusion information can be used to further reduce such artifacts.

The view synthesis or rendering process that makes use of occlusion information can be implemented in a two-stage approach. In the first stage, a view is rendered using the occluded image and the occluded depth information. In case there is no suitable occlusion information, e.g. when for coding-efficiency reasons only partial occlusion information is available, the above described image stretching can be applied.

In the second stage, the foreground image 205 and the depth-map 210 are rendered using a rendering process wherein the step of stretching is omitted. The output of the second stage is superimposed over the output of the first step. Consequently, pixels that are not defined in the second stage are defined by the first stage.

Processing the Depth Map

Figure 6:
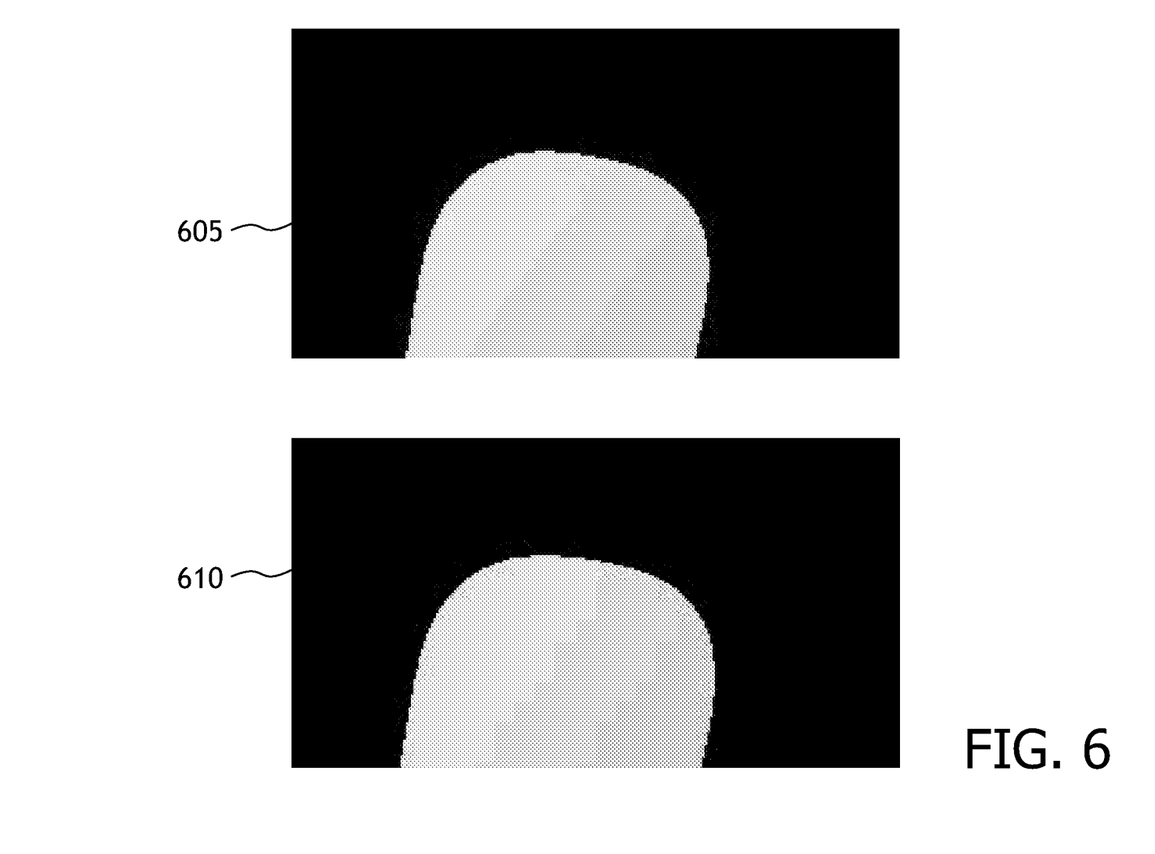
FIG. 6 shows a ground truth depth map as well as a depth map comprising compression artifacts resulting from lossy compression.

FIG. 6 illustrates a ground truth depth map 605 as well as a depth map 610 comprising compression artifacts resulting from lossy compression.

Figure 7:
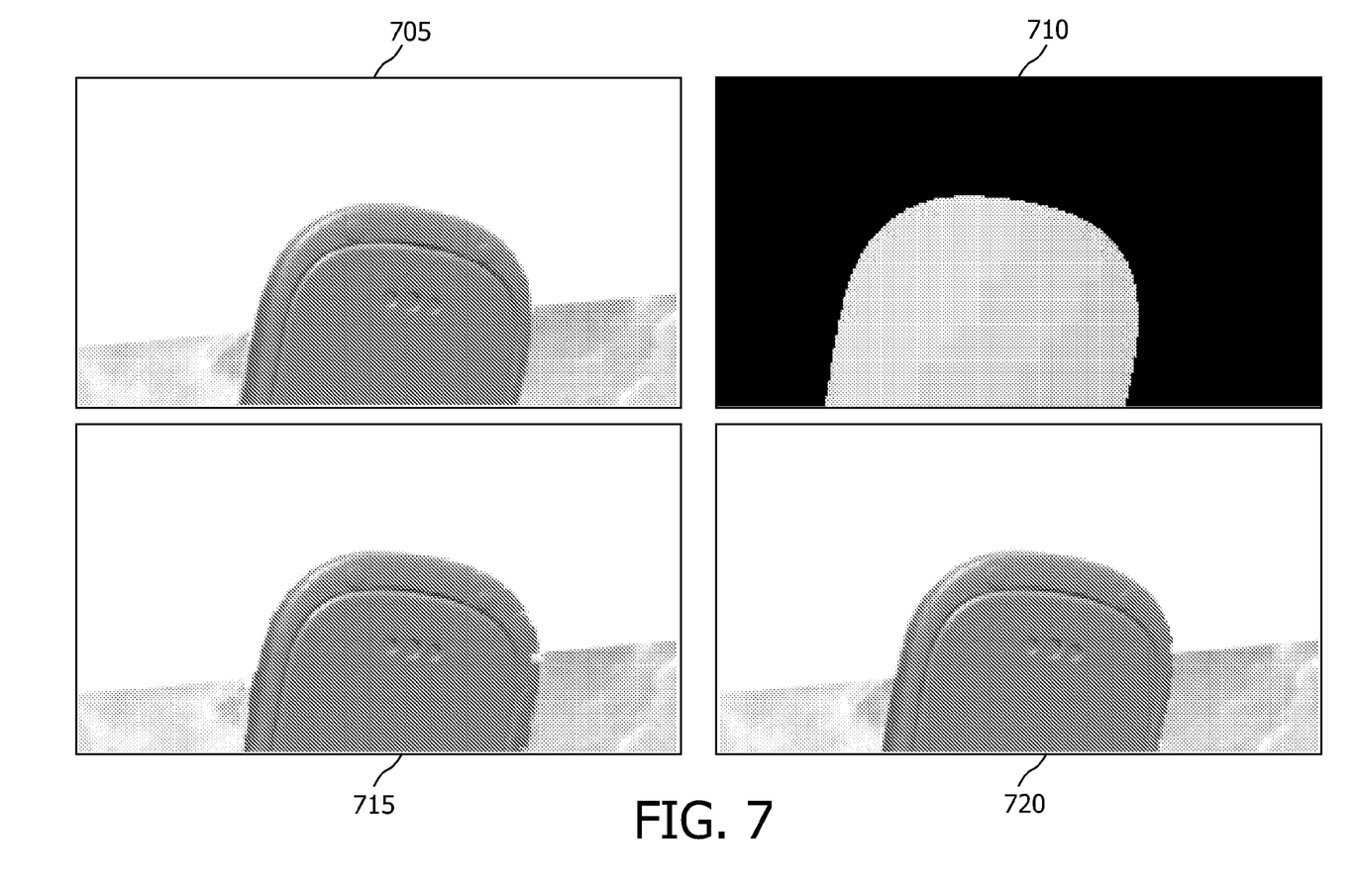
FIG. 7 shows a rendered view based on a lossy compressed depth-map with and without processing according to the present invention.

FIG. 7 illustrates that when such a decompressed depth map 710 is used together with an image 705 as input for a view-rendering process, the resulting synthesized view 715 is substantially distorted. This distortion is a direct result of the compression artifacts in the depth information. As depth information is used to displace image information from the image 605 in dependence on the depth of the object relative to the viewpoint, errors in the depth information will result in incorrect displacements.

As a result, an error in the depth information will be converted into an erroneous translation of pixel data. This in turn has a substantial impact on the rendered image, and in particular on object borders. This effect is clearly visible in the form of the deformed and erratic form of object edges in the synthesized view 715.

Typically, coding or compression artifacts are introduced at strong transitions. The present invention proposes to use the occlusion information, such as occluded image information, occluded depth information and/or occluded disparity information to reduce the coding artifacts introduced in the depth-map during compression and subsequent decompression.

In case only occluded image information is available, this information provides information on the location of object edges in the image 205, and indirectly provides information regarding potential depth transitions in the depth-map 210. This information may be used advantageously when applying an edge-preserving filtering step to depth-map 210. Preferably, such an edge-preserving filter does not smooth the depth transitions. Preferably, the edge-preserving filter maps the respective depth information values on each side of the edge to a common value of the depth information on the respective side of the edge. An example of such a filter is a K-means filter. Those skilled in the art of video processing will recognize that a wide range of anisotropic filters may be applied.

Alternatively, as indicated above, occluded depth information may be reconstructed using occluded image information. It is however preferred to include the occluded depth information in the occlusion information. When depth information is available for the occluded region and/or a region around the occlusion area, this information can be used to improve both the depth-map 210 as well as the occluded depth information 220. The underlying idea is to use the depth information from the occluded region to improve the quality and/or steer the processing of the depth information from the depth map 210. Conversely, the depth information from the depth-map 210 can also be used to improve the quality and/or steer the processing of the depth information from the occluded depth information.

In a bit rate-efficient implementation, the occluded depth-map is coded only in areas where strong depth transitions occur. In addition, to reduce the computational complexity, processing on the depth map 710 is only performed in areas where strong depth transitions occur.

A simple embodiment of such a post-processing step for the depth-map as shown in 210 could be to perform a MAX operation (select the maximum) on each value of the depth-map 210 and the corresponding value of the occluded depth information 220. This will remove undershoot artifacts in the depth map 710 of the center view. It is envisaged that by taking into account further pixels in spatial proximity on the proper side of a transition, further, more elaborate filtering could be performed. In particular in case of video sequences, it is envisaged that such a filtering operation could also provide temporal consistency by taking into account the motion of objects. In both spatial and temporal enhancements it remains important to substantially preserve the edges in the depth map 210.

Up to this point the depth map 210 has been the target of the post-processing step. However, a similar post-processing step may be applied with equal advantage to the occluded depth information 220. In a simple embodiment, the MAX operation as suggested before might be replaced by a MIN operation (to select the minimum of each value) in order to derive improved occluded depth information 220.

In another embodiment, the post-processing step could also be applied such that the artifacts in the foreground object present in the depth-map 210 may be reduced as well. This could be achieved by first detecting strong depth transitions in the center view depth-map (e.g. by determining the MIN and MAX over a window and considering the average as the crossing of the transition).

Around these transitions the depth-map pixels should have a high quality. Therefore, replacing the depth-map pixels around an edge in the foreground depth-map with pixels from the background depth-map will improve the overall quality as the depth-map does not comprise this transition.

A dilation step may be required to circumvent that foreground objects are placed on the background. In case the dilation factor is provided in the form of metadata together with the other image data, this value can be used. The dilation factor can then be used to determine the amount of data around a depth transition that should be replaced.

In a further embodiment of the present invention, the processing step comprises establishing a replacement criterion for a pixel from the depth information in proximity of a depth transition, the replacement criterion classifying which side of the transition the pixel belongs to. Subsequently, the pixel from the depth information is conditionally replaced, based on the replacement criterion, with a replacement pixel. In order to improve the quality of the depth information, the replacement pixel should statistically correspond with the spatial context as indicated by the replacement criterion; i.e. it should be consistent with the depth information on that side of the depth transition. For example, when a k-means algorithm is used, the mean value of the cluster on the appropriate side of the transition could be used as the replacement pixel value.

It is important to note that at least one of the replacement criterion and the replacement pixel are based on occlusion information; in this manner an improved depth-map consistency can be obtained, as the occlusion information provides additional information that can be used to reconstruct the proper depth information.

If the replacement criterion is based, at least in part, on the occlusion information, it may be possible to use the spatial context of the pixel from the depth information in order to establish the replacement pixel value. Preferably, the spatial context of a pixel from the occlusion information, i.e. pixels in proximity of the pixel, is used to determine the replacement pixel. More preferably, the spatial context of a corresponding pixel from the occlusion depth information is used to establish the replacement pixel. It will be clear that it may suffice to establish such replacement criteria in proximity to a depth transition, but alternatives are possible too. Instead, such criteria could be established for each pixel in the entire image.

Although typically transitions in the depth information will be clear, in particular when the depth information is down-scaled prior to coding, or is coded at a very low bit rate, depth transitions may be weak. As a result, it is advantageous to use an edge-reconstructive filter that utilizes information from the spatial context of a transition to reconstruct transitions in the depth-map.

For example, when the depth information is provided at a lower resolution, an edge in down-scaled depth information may be "smeared" during the down-scaling process. As a result, it is advantageous to reconstruct the edge. In an implementation of the present invention that uses a k-means algorithm to determine the replacement criterion, it is beneficial to establish the proper depth values on either side of a transition, and subsequently determine the most probable location of the edge based on the depth values across the actual depth transition.

It may be possible to determine for example a first mean corresponding with the depth value on one side of the transition, and a second mean corresponding with the depth value on the other side of the transition. The reconstructed edge could then be positioned halfway between the first and second mean. Although here the concept of edge reconstruction is explained with regard to a k-means solution, this is not mandatory, and other edge reconstruction techniques might be applied with equal advantage.

FIG. 7 shows two rendered views based in part on image 705 and depth map 710 as well as on occlusion information in the form of occluded image information and occluded depth information (not shown). The first rendered view 715 is based on the formerly compressed depth-map 710, whereas the second rendered view 720 is based on a formerly compressed depth-map that was post-processed in accordance with the present invention. As indicated earlier, the first rendered view 715 is severely affected by the compression artifacts present in the depth-map 710. By contrast, in the second rendered view 720 object edges are much closer to the object edges in the original image 705.

Although the present invention has been demonstrated using examples wherein the depth-map resolution matches the image resolution, it will be clear to the skilled person that the present invention may be applied with equal advantage in situations wherein the respective resolutions differ.

Figure 8:
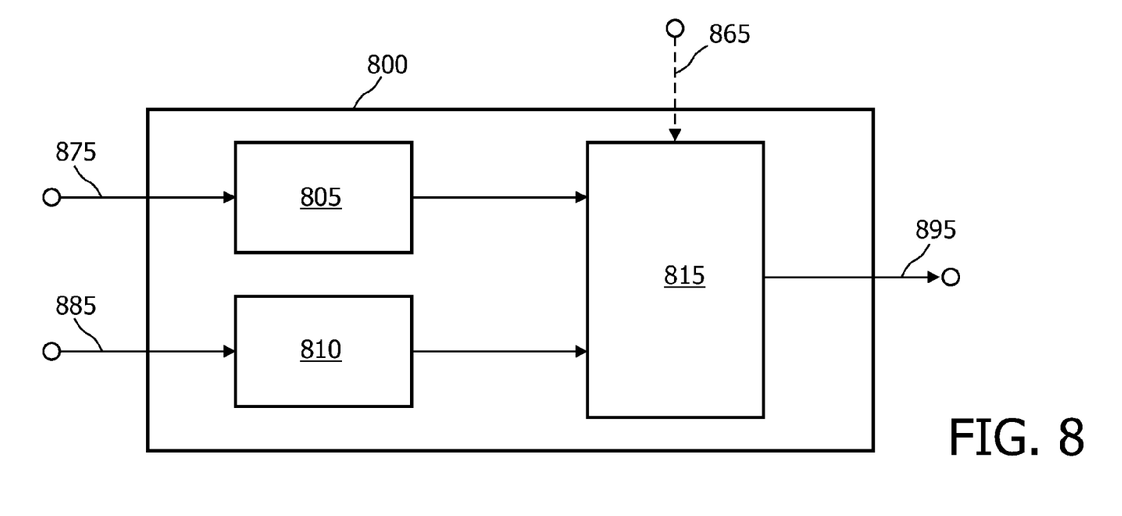
FIG. 8 shows a device according to the present invention.

FIG. 8 shows a device 800 according to the present invention. The device 800 comprises means 805 arranged to obtain a depth-map 875 based on a lossy compressed depth-map, the depth-map 875 comprising depth information of a scene from a viewpoint, the scene comprising an object. The device 800 further comprises means 810 arranged to obtain occlusion information 885 for the scene from the viewpoint, the occlusion information 885 comprising information occluded by the object in the depth-map 875. Finally, the device comprises means 815 arranged to process at least part of the depth information using at least part of the occlusion information in order to reduce compression artifacts in the depth-map 875. The means 815 may optionally use further information such as metadata and/or image data in the processing of the depth map 875.

It will be clear to the skilled person that the apparatus 800 can be constructed using either hardware components in the form of e.g. an Application Specific Integrated Circuit (ASIC) or multiple ASICs, or using a programmable platform comprising one or more digital signal processors or even general purpose processors. Combinations of the aforementioned implementations are also envisaged. The skilled person will be able to construct such an implementation based on constraints such as clock frequency, the available computational capacity on a programmable platform and/or other constraints well known to those skilled in the art of designing systems for video processing.

Figure 9:
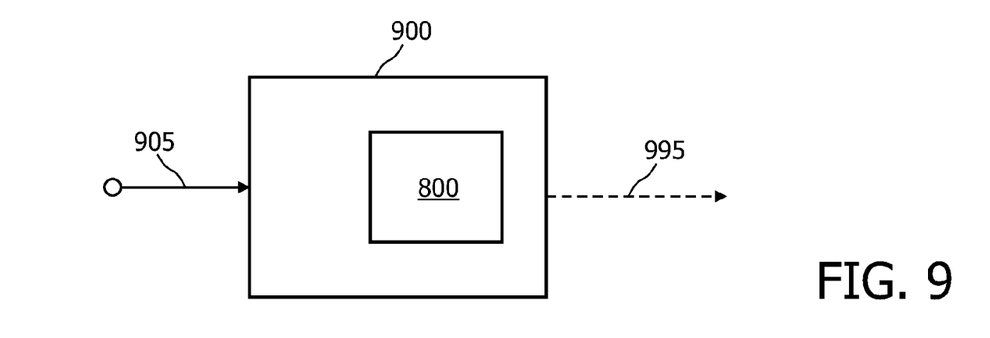
FIG. 9 shows a consumer electronics device comprising a device according to the present invention.

FIG. 9 depicts an implementation of a consumer electronics device 900 comprising a device 800 according to the present invention. The consumer electronics device 900 could be e.g. a Set Top Box (STB) that receives an incoming Transport Stream 905 over a network, comprising at least one image sequence which includes image information, depth information, occluded image information, and optionally, occluded depth information. The STB arranged to render multiple views 995 for output to an autostereoscopic display. Alternatively, the consumer electronics device could be an autostereoscopic display arranged to receive an image sequence 905 which includes image information, depth information, occluded image information, and optionally, occluded depth information, which is used to render multiple views for display on the autostereoscopic display 900. In this particular embodiment, the individual views need not be output in a digital format to another device, as a result the output 995 is represented as a dashed line.

Throughout the description the term "obtaining" is understood to include obtaining by means of reception from e.g. a network or a data carrier, as well as obtaining by means for processing e.g. by decompression, or reconstruction of such data.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

Use of the verb "to comprise" and its conjugations does not exclude the presence of elements other than those stated in the claims. Use of the article "a" or "an" preceding an element does not exclude the presence of a plurality of such elements.

The invention claimed is:

1. A method of processing a depth-map, the method comprising acts of:
    obtaining the depth-map based on a lossy compression algorithm, the depth-map comprising depth information of a scene from a viewpoint, an object occluding a portion of the scene from the viewpoint;
    obtaining information occluded by the object; and
    reducing compression artifacts in the depth-map using at least part of the depth information and the scene information occluded by the object.

2. The method of claim 1, wherein the scene information occluded by the object comprises depth information occluded by the object.

3. The method of claim 2, wherein the act of reducing comprises an act of establishing one of a minimum and a maximum value from among:
    a pixel from the depth information; and
    a corresponding pixel from the scene information.

4. The method of claim 1, wherein reducing compression comprises an act of processing at least part of the depth information within a predetermined region around a transition in the depth information related to the object.

5. The method of claim 1, wherein reducing compression comprises an act of processing at least part of the depth information within a predetermined region around the object.

6. The method of claim 1, further comprising an act of:
    obtaining metadata providing information pertaining to the size of the region.

7. The method of claim 1, wherein at least part of the scene information occluded by the object is from a region corresponding to the region of the depth information being processed.

8. The method of claim 1, wherein the lossy compression algorithm introduces noise around a transition in depth information.

9. The method of claim 1, wherein the lossy compression algorithm uses a frequency domain representation for representing depth information in the depth-map.

10. The method of claim 1, wherein the method further comprises establishing a transition in the depth information.

11. The method of claim 1, wherein reducing compression comprises acts of:
    establishing a replacement criterion for a pixel from the depth information in proximity of a depth transition, the replacement criterion classifying which side of the transition the pixel belongs to; and
    conditionally replacing the pixel from the depth information based on the replacement criterion with a replacement pixel, the replacement pixel statistically corresponding with a spatial context as indicated by the replacement criterion,
    wherein at least one of the replacement criterion and the replacement pixel are based on the scene information occluded by the object.

12. The method of claim 11, wherein the replacement criterion is established by filtering over at least one of:
    the spatial context of the pixel from the depth information; and
    the spatial context of a pixel from the scene information occluded by the object corresponding to the pixel from the depth information.

13. The method of claim 12, wherein the replacement pixel is one of:
- a pixel from the scene information corresponding with the pixel from the depth information; and
- a pixel based on the spatial context of the pixel from the scene information corresponding with the pixel from the depth information.

14. The method of claim 1, comprising an act of providing metadata pertaining to the size of the region for processing.

15. A device for processing a depth-map, the device comprising:
- a first receiver configured to obtain a depth-map based on a lossy compressed depth-map, the depth-map comprising depth information of a scene from a viewpoint, an object occluding a portion of the scene from the viewpoint;
- a second receiver configured to obtain the scene information occluded by the object; and
- a processor configured to process at least part of the depth information and the scene information occluded by the object to reduce compression artifacts in the depth-map.

16. A non-transitory memory medium for storing processor instructions for processing a depth-map, the processor instructions configuring the processor to perform a method comprising acts of:
- obtaining the depth-map based on a lossy compression algorithm, the depth-map comprising depth information of a scene from a viewpoint, an object occluding a portion of the scene from the viewpoint;
- obtaining scene information occluded by the object; and
- reducing compression artifacts in the depth-map using at least part of the depth information and the scene information occluded by the object.

* * * * *